United States Patent
Ishikawa et al.

(10) Patent No.: US 9,521,290 B2
(45) Date of Patent: Dec. 13, 2016

(54) IMAGE PROCESSING APPARATUS, IMAGE FORMING APPARATUS, IMAGE PROCESSING METHOD, AND NON-TRANSITORY COMPUTER READABLE MEDIUM FOR DETECTING DIFFERENCE BETWEEN IMAGES

(71) Applicant: FUJI XEROX CO., LTD., Tokyo (JP)

(72) Inventors: Tomohisa Ishikawa, Kanagawa (JP); Naoyuki Enomoto, Kanagawa (JP); Yozo Kashima, Kanagawa (JP); Tetsuharu Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/595,295

(22) Filed: Jan. 13, 2015

(65) Prior Publication Data

US 2016/0044204 A1   Feb. 11, 2016

(30) Foreign Application Priority Data

Aug. 6, 2014 (JP) .................................. 2014-160234

(51) Int. Cl.
*H04N 1/23* (2006.01)
*H04N 1/04* (2006.01)

(52) U.S. Cl.
CPC .............. *H04N 1/2392* (2013.01); *H04N 1/04* (2013.01)

(58) Field of Classification Search
None
See application file for complete search history.

(56) References Cited

FOREIGN PATENT DOCUMENTS

| JP | 04-133176 A | 5/1992 |
|----|---|---|
| JP | 09-50513 A | 2/1997 |
| JP | 2010066865 A * | 3/2010 |

* cited by examiner

*Primary Examiner* — Thomas D Lee
(74) *Attorney, Agent, or Firm* — Sughrue Mion, PLLC

(57) ABSTRACT

An image processing apparatus includes a difference detector that detects a difference between two images according to a set detection condition, a receiving unit that receives the two images as comparison targets and a target difference image that is desirable in difference detection of the two images, and a setting unit that selects a detection condition from predetermined detection conditions and sets the selected detection condition in the difference detector, the selected detection condition causing a difference image that is acquired by the difference detector from the two images received by the receiving unit to be closer to the target difference image.

11 Claims, 16 Drawing Sheets

FIG. 5

| PARAMETER SET NUMBER | DIFFERENCE DETECTION SENSITIVITY | NOISE REMOVAL LEVEL | RESOLUTION |
| --- | --- | --- | --- |
| 1 | 3 | 3 | 300 dpi |
| 2 | 3 | 5 | 300 dpi |
| 3 | 3 | 7 | 300 dpi |
| 4 | 4 | 3 | 300 dpi |
| 5 | 4 | 5 | 300 dpi |
| 6 | 4 | 7 | 300 dpi |
| 7 | 5 | 3 | 400 dpi |
| 8 | 5 | 5 | 400 dpi |
| 9 | 5 | 7 | 400 dpi |
| 10 | 6 | 3 | 400 dpi |
| 11 | 6 | 5 | 400 dpi |
| 12 | 6 | 7 | 400 dpi |

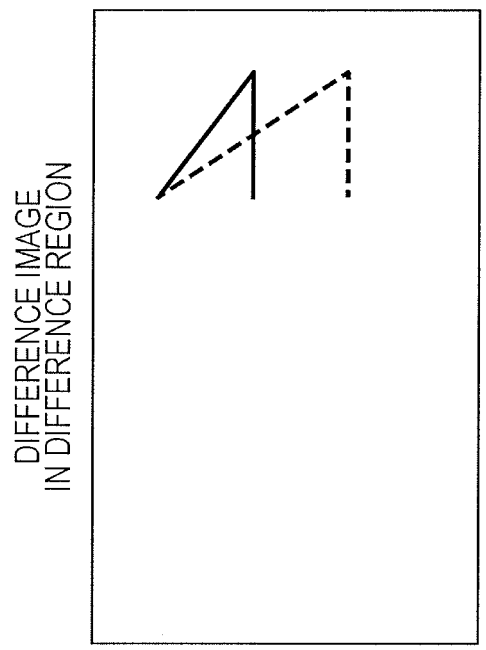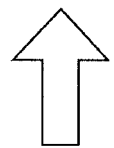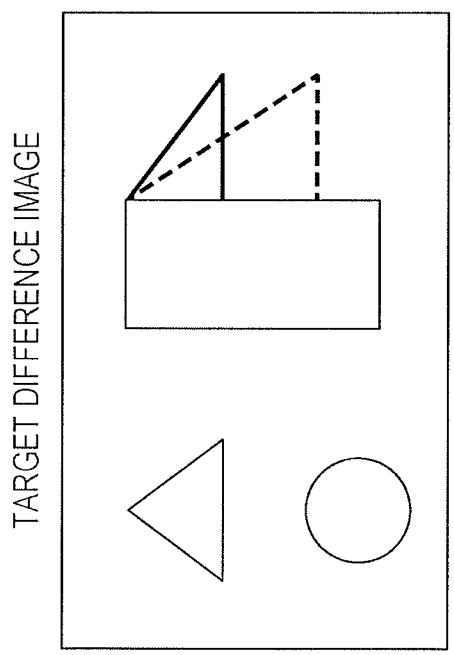
FIG. 11

FIG. 15
PARAMETER SET 1
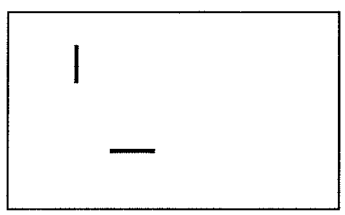
AMOUNT OF DIFFERENCE D(1)
= 12 DOTS
PARAMETER SET 2
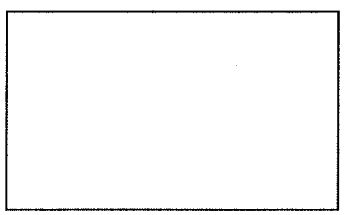
AMOUNT OF DIFFERENCE D(2)
= 0 DOTS
PARAMETER SET 3
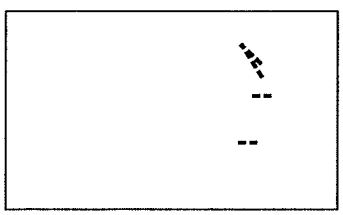
AMOUNT OF DIFFERENCE D(3)
= 10 DOTS

IMAGE PROCESSING APPARATUS, IMAGE FORMING APPARATUS, IMAGE PROCESSING METHOD, AND NON-TRANSITORY COMPUTER READABLE MEDIUM FOR DETECTING DIFFERENCE BETWEEN IMAGES

CROSS-REFERENCE TO RELATED APPLICATIONS

This application is based on and claims priority under 35 USC 119 from Japanese Patent Application No. 2014-160234 filed Aug. 6, 2014.

BACKGROUND

Technical Field

The present invention relates to an image processing apparatus, an image forming apparatus, an image processing method, and a non-transitory computer readable medium.

SUMMARY

According to an aspect of the invention, there is provided an image processing apparatus. The image processing apparatus includes a difference detector that detects a difference between two images according to a set detection condition, a receiving unit that receives the two images as comparison targets and a target difference image that is desirable in difference detection of the two images, and a setting unit that selects a detection condition from predetermined detection conditions and sets the selected detection condition in the difference detector, the selected detection condition causing a difference image that is acquired by the difference detector from the two images received by the receiving unit to be closer to the target difference image.

BRIEF DESCRIPTION OF THE DRAWINGS

Exemplary embodiments of the present invention will be described in detail based on the following figures, wherein:

FIG. 5 illustrates an example of a parameter set stored on a parameter memory in the difference image generation apparatus in the image forming system of the first exemplary embodiment of the present invention;

FIG. 11 illustrates how image data is generated in a difference region from target difference image data;

FIG. 15 illustrates the difference image resulting from the difference detection operation described with reference to FIG. 14.

DETAILED DESCRIPTION

Exemplary embodiments of the present invention are described with reference to the drawings.

First Exemplary Embodiment

Figure 1:
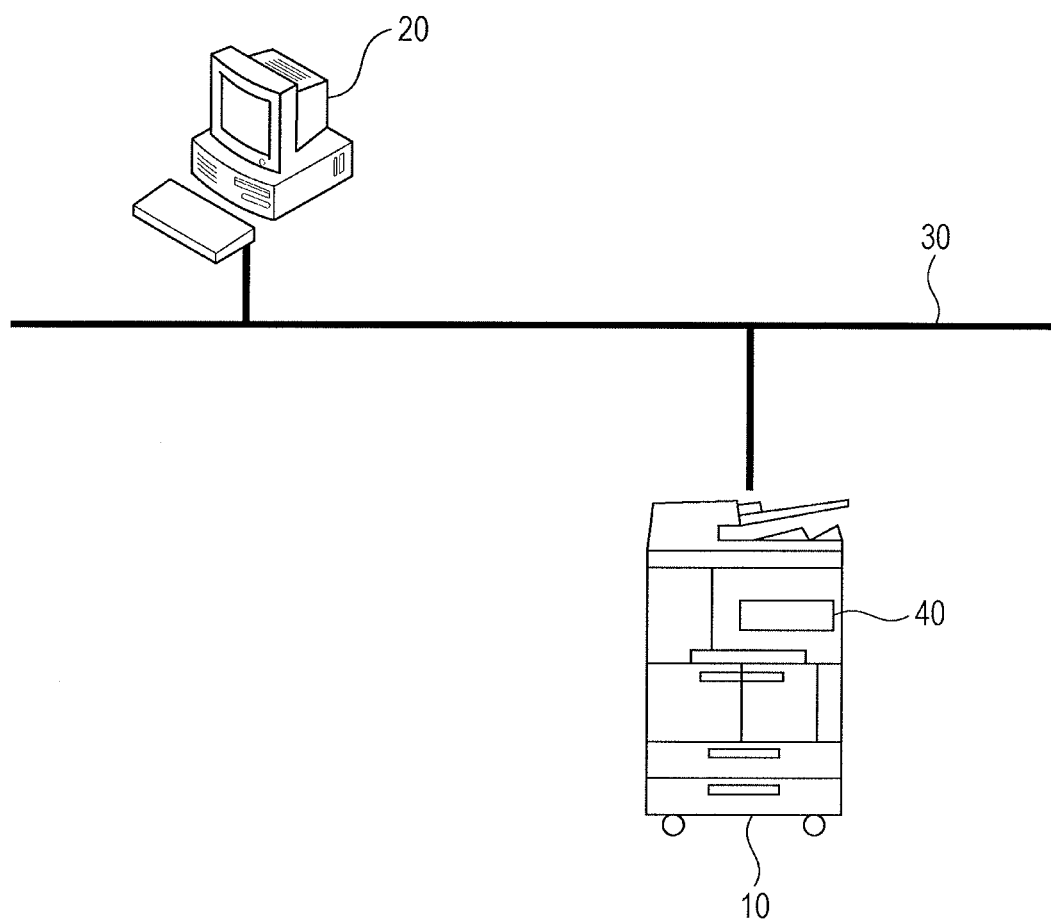
FIG. 1 illustrates a configuration of an image forming system of a first exemplary embodiment of the present invention.

FIG. 1 illustrates the configuration of the image forming system of a first exemplary embodiment of the present invention.

The image forming system of the first exemplary embodiment of the present invention includes an image forming apparatus 10 and a terminal apparatus 20 connected to each other via a network 30 as illustrated in FIG. 1. The terminal apparatus 20 generates print data and transmits the generated print data to the image forming apparatus 10 via the network 30. Upon receiving the print data from the terminal apparatus 20, the image forming apparatus 10 outputs an image responsive to the print data onto a paper sheet. The image forming apparatus 10 is a multi-function apparatus having multiple functions including a print function, a scan function, a copy function, and a facsimile function.

The image forming apparatus 10 is extendable with a difference image generation apparatus (image processing apparatus) 40 optionally added thereto. The difference image generation apparatus 40 receives two pieces of image data as comparison targets, such as old and new drawing data, detects a difference between the two pieces of drawings data, and outputs (displays or prints) the detected difference as a single piece of data. For example, the difference image generation apparatus 40 displays in red a region that is present in the old data but is deleted from the new data and displays in blue a region that is not present in the old data but is added in the new data. The difference image generation apparatus 40 thus displays the difference between the old drawing data and the old drawing data on the single piece of image data. When the difference is displayed, a region where the difference is detected is enclosed in a rectangular outline to indicate to the user the location where the difference has been detected.

More specifically, the difference image generation apparatus 40 first converts the two pieces of drawing data to be compared into binary image data, and successively compare corresponding pixels to detect a difference between the two pieces of drawing data.

If two drawings to be compared are paper documents, a scanner of the image forming apparatus 10 scans images of the documents to convert the images to image data, and outputs the image data to the difference image generation apparatus 40 for difference detection.

The image forming apparatus 10 generates an image based on difference image data generated by the difference image generation apparatus 40, and outputs the image by printing the image on a paper sheet or the like.

Figure 2:
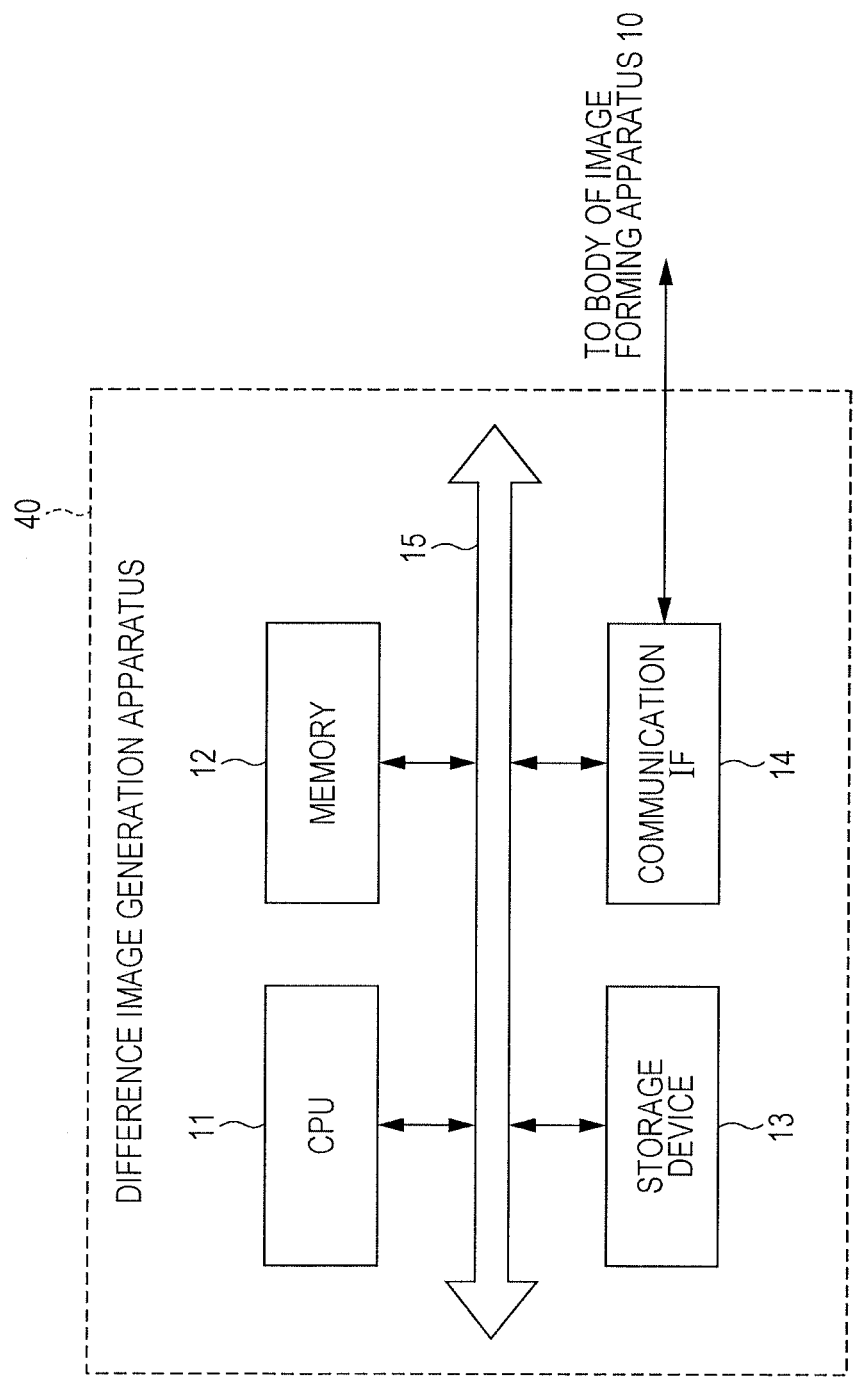
FIG. 2 illustrates a hardware configuration of a difference image generation apparatus in the image forming system of the first exemplary embodiment of the present invention.

FIG. 2 illustrates the hardware configuration of the difference image generation apparatus 40 in the image forming system of the first exemplary embodiment.

As illustrated in FIG. 2, the difference image generation apparatus 40 includes a central processing unit (CPU) 11, a memory 12, a storage device 13, such as a hard disk drive (HDD), a communication interface (IF) 14 that transmits data to or receives data from the image forming apparatus 10. These elements are interconnected via a control bus 15.

The CPU 11 performs a predetermined process in accordance with a control program stored on the memory 12 or the storage device 13. The CPU 11 thus controls the operation of the difference image generation apparatus 40.

In the first exemplary embodiment, the CPU 11 reads the control program from the memory 12 or the storage device 13 and executes the control program. Alternatively, the control program may be stored on a storage medium, such as a compact disk read-only memory (CD-ROM), and then transferred to the CPU 11.

Figure 3:
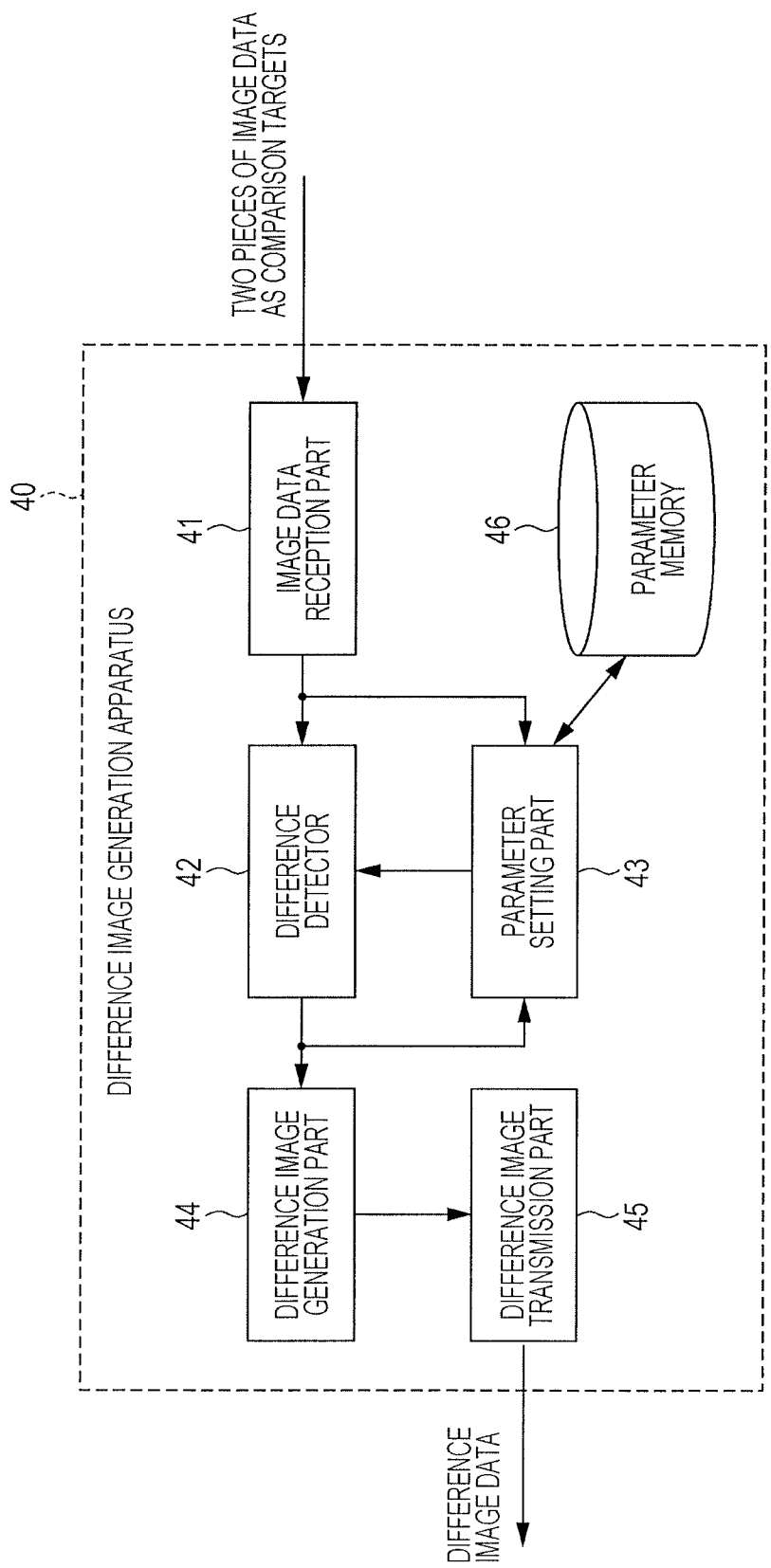
FIG. 3 is a block diagram of the difference image generation apparatus in the image forming system of the first exemplary embodiment of the present invention.

FIG. 3 is a functional block diagram of the difference image generation apparatus 40 that is implemented when the control program is executed.

As illustrated in FIG. 3, the difference image generation apparatus 40 includes an image data reception part 41, a difference detector 42, a parameter (detection condition) setting part 43, a difference image generation part 44, and a difference image transmission part 45.

The image data reception part 41 receives two pieces of image data to be compared from the image forming apparatus 10 or the terminal apparatus 20. More specifically, the image data reception part 41 may receive data read by the scanner of the image forming apparatus 10 or may directly receive a digital document in the portable document format (PDF) from the terminal apparatus 20, such as a personal computer. The format of the image data to be compared may be vector graphics or image.

The two pieces of image data to be compared are old and new data drawing data in the following discussion. The image data to be discussed is not limited to the drawing data.

The image data reception part 41 receives two images as comparison targets and a target difference image that is a difference image to be desired in the difference detection of the two images.

The difference detector 42 detects a difference between two pieces of image data, received from the image data reception part 41, according to a parameter (a detection condition) set by the parameter setting part 43. The difference detector 42 successively compares the two pieces of image data as the comparison targets on a per pixel basis, thereby detecting a difference (an addition portion and a deletion portion) of the two pieces of image data.

In order to compare the image data of the old and new drawings, the difference detector 42 generates difference information of the image data of the old and new drawings, and transmits to the difference image generation part 44 the difference information together with the image data of a common portion of the old and new drawings. The difference information includes an image that represents a region that is not present in the old drawing but is added to the new drawing, and an image that represents a region that is present in the old drawing but is deleted and not present in the new drawing.

Figure 4:
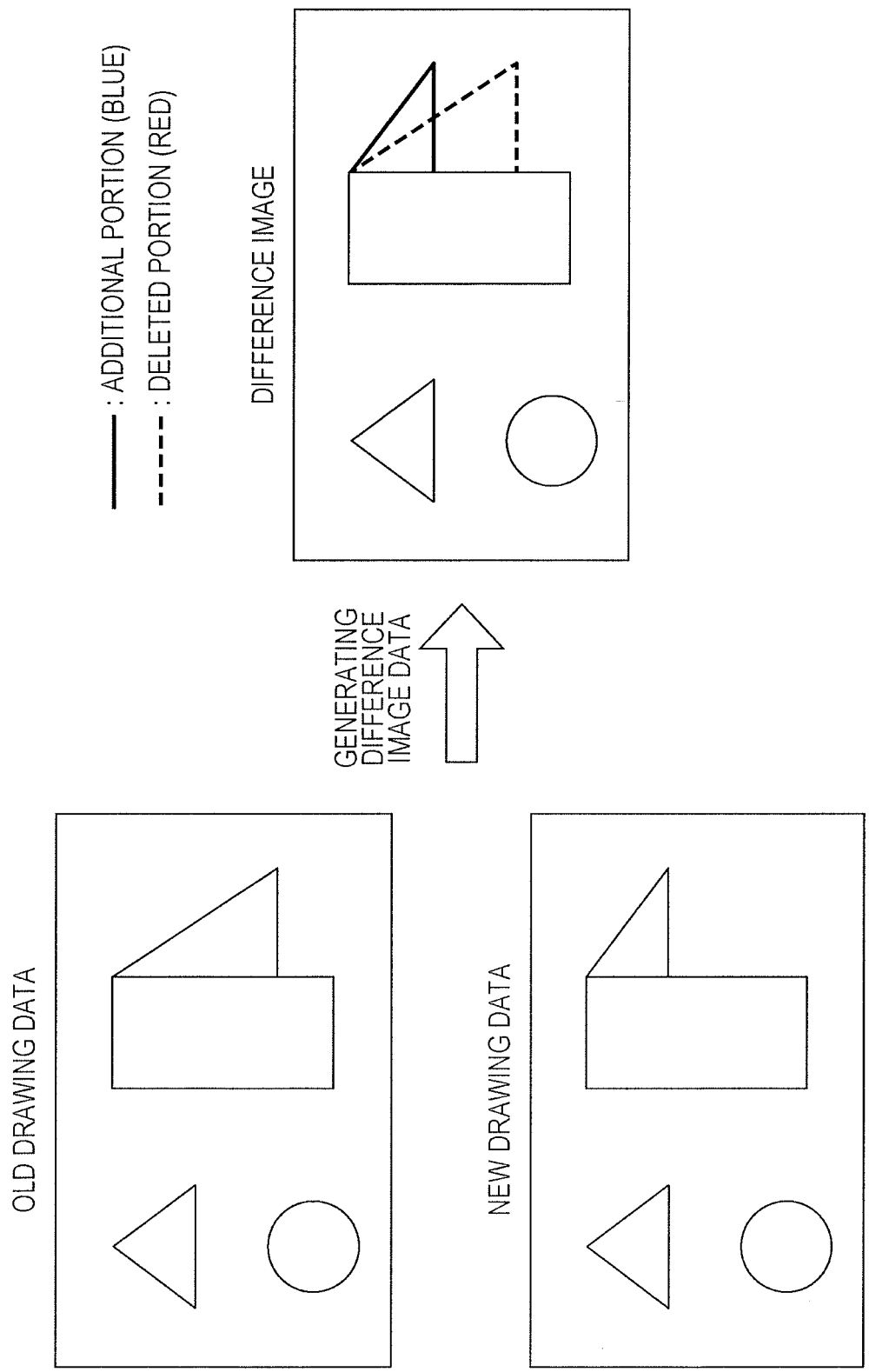
FIG. 4 illustrates a difference detection process of the difference image generation apparatus in the image forming system of the first exemplary embodiment of the present invention.

The difference image generation part 44 generates the difference image data that is organized so that the difference region detected by the difference detector 42 is visibly recognized. As illustrated in FIG. 4, for example, the difference image generation part 44 generates a difference image where the addition portion added in the new drawing is displayed in blue, and the deletion portion deleted from the old drawing is displayed in red.

The difference image transmission part 45 transmits the difference image generated by the difference image generation part 44 to the terminal apparatus 20 and the body of the image forming apparatus 10.

The image forming apparatus 10 includes an output unit that outputs onto a print paper sheet an image that is generated in accordance with the difference image data generated by the difference image generation part 44. Upon receiving the difference image data from the difference image transmission part 45, the image forming apparatus 10 performs an output operation to output the image onto the print paper sheet.

The parameters set by the parameter setting part 43 includes one of the conditions including a resolution of the images as the comparison targets, a noise removal level in reading the images, a difference detection sensitivity that specifies a degree of discrepancy that is regarded as a difference, and a position correction level of the two images as the comparison targets.

The difference detection sensitivity is a parameter that specifies what degree of discrepancy between the old and new images is detected as a difference, and may be set within a range from 0 to 10, for example. In such a range, as the value is smaller, the finer discrepancy is detected as a difference.

The noise removal level is a parameter that specifies what level of noise caused by dirt on a drawing or dirt on a scanner is to be detected as a difference. The noise removal level may be set to be within a range of 0 to 10. As the value is larger, the noise of higher level caused by dirt on the scanner is removed before the detection of the difference.

The meaning of the resolution is different depending on the format of the input image data as the comparison target. If the scanner scans a drawing to detect the difference, the resolution may be specified on the scanner in the scan operation. If the difference is detected on the input digital data, the resolution refers to a resolution that is specified when original image data is converted into a data format that permits the difference detection process to be performed (processing resolution in vector graphics).

The position correction level of the two images as the comparison targets refers to the degree of automatic correction performed to the tilt of the old and new drawings, a general misregistration, and a difference between the sizes of the two images to be compared.

Some of these parameters are set in the discussion that follows. The present invention is applicable as long as one of the parameters or a combination of multiple parameters is set in the difference detector 42.

The parameter memory 46 stores a set of multiple parameters (detection conditions) including a combination of predetermined parameters. FIG. 5 illustrates an example of the parameter set stored on the parameter memory 46. FIG. 5 lists 12 parameter sets, each including a combination of three parameters of the difference detection sensitivity, the noise removal level, and the resolution.

In the example of FIG. 5, the parameter set number 1 is a combination of a difference detection sensitivity of "3", a noise removal level of "3", and a resolution of "300 dpi".

The difference detector 42 acquires a difference image by detecting a difference between the two images received by the image data reception part 41. The parameter setting part 43 selects from the multiple parameter sets stored on the parameter memory 46 a parameter set that causes the difference image to be closer to the target difference image, and then sets the selected parameter set in the difference detector 42.

In order to set the parameter, the parameter setting part 43 successively selects a parameter set from the multiple parameter sets stored on the parameter memory 46 and then sets the selected parameter set in the difference detector 42.

The difference detector 42 successively detects a difference between the two images received by the image data reception part 41 in accordance with the set parameter set.

The parameter setting part 43 selects from the multiple parameter sets stored on the parameter memory 46 a parameter set that minimizes a difference between the number of pixels in a difference region in a target difference image and the number of pixels in a difference region in the difference image detected by the difference detector 42. The parameter setting part 43 then sets the selected parameter set in the difference detector 42.

Figure 6:
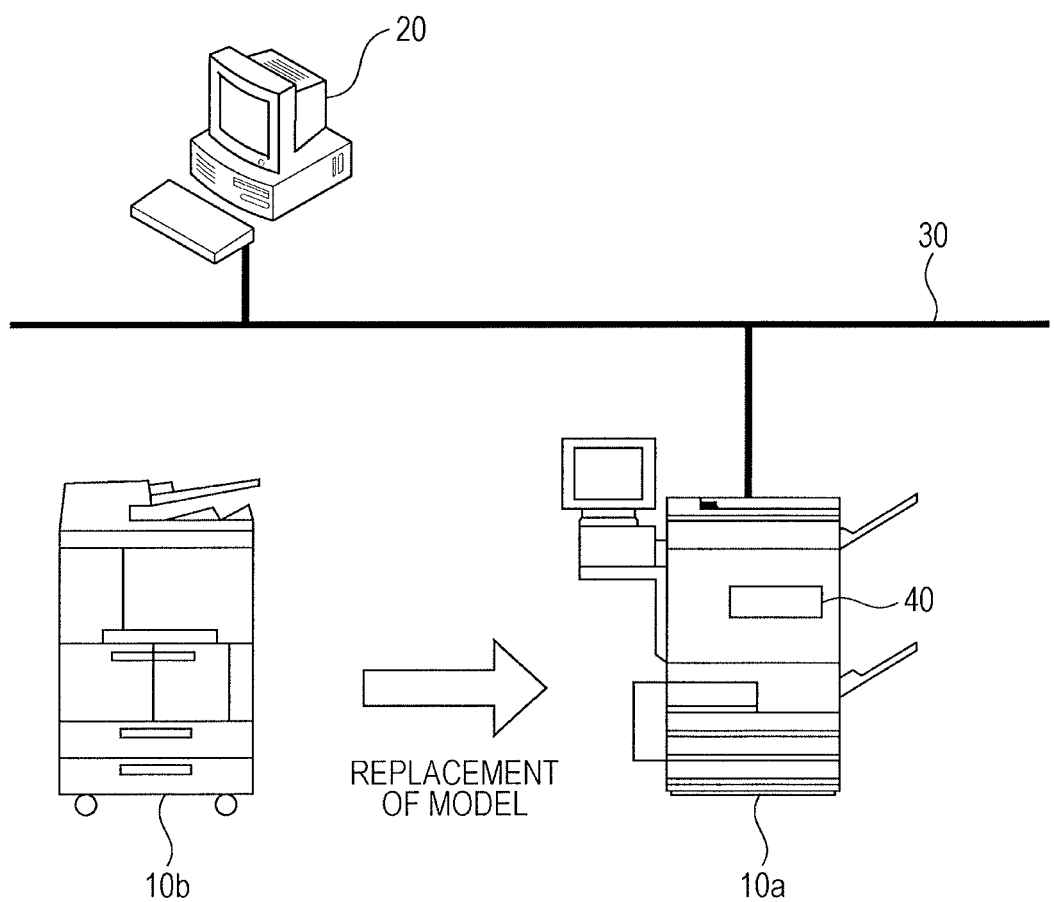
FIG. 6 illustrates replacement of models in which a first image forming apparatus is replaced with a second image forming apparatus.

The parameter setting part 43 performs the parameter setting operation when an image forming apparatus 10a is replaced with an image forming apparatus 10b as illustrated in FIG. 6. The image forming apparatus 10a and the image forming apparatus 10b, if different in scanner image reading characteristics from each other, may result in different difference images even with the same parameter set in the difference detection in the difference image generation apparatus 40. Even in such a case, the user may desirably obtain difference detection results from the image forming apparatus 10b as close as possible to the difference detection results obtained from the image forming apparatus 10a prior to the model replacement.

Figure 7:
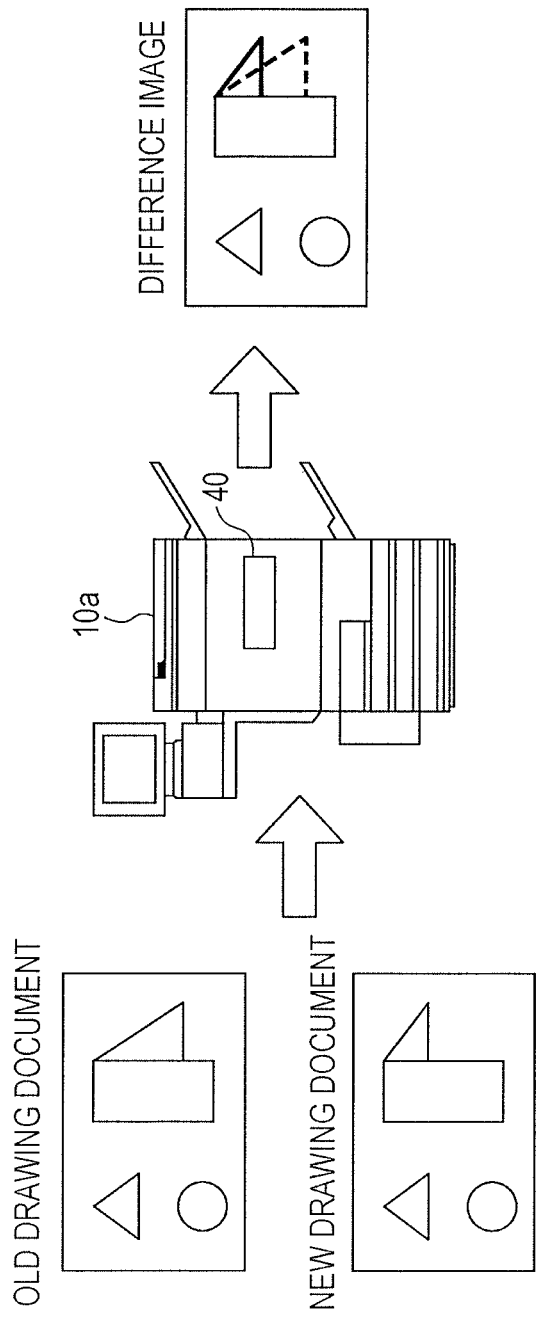
FIG. 7 illustrates an operation in which the first image forming apparatus reads old and new drawing documents and the difference image generation apparatus acquires a difference image by detecting a difference between the old and new drawing documents.

If the model is replaced in this way, the user operates the image forming apparatus 10a in order to read the old and new drawing documents, and a difference image is acquired on the difference image generation apparatus 40 by performing difference detection as illustrated in FIG. 7.

Figure 8:
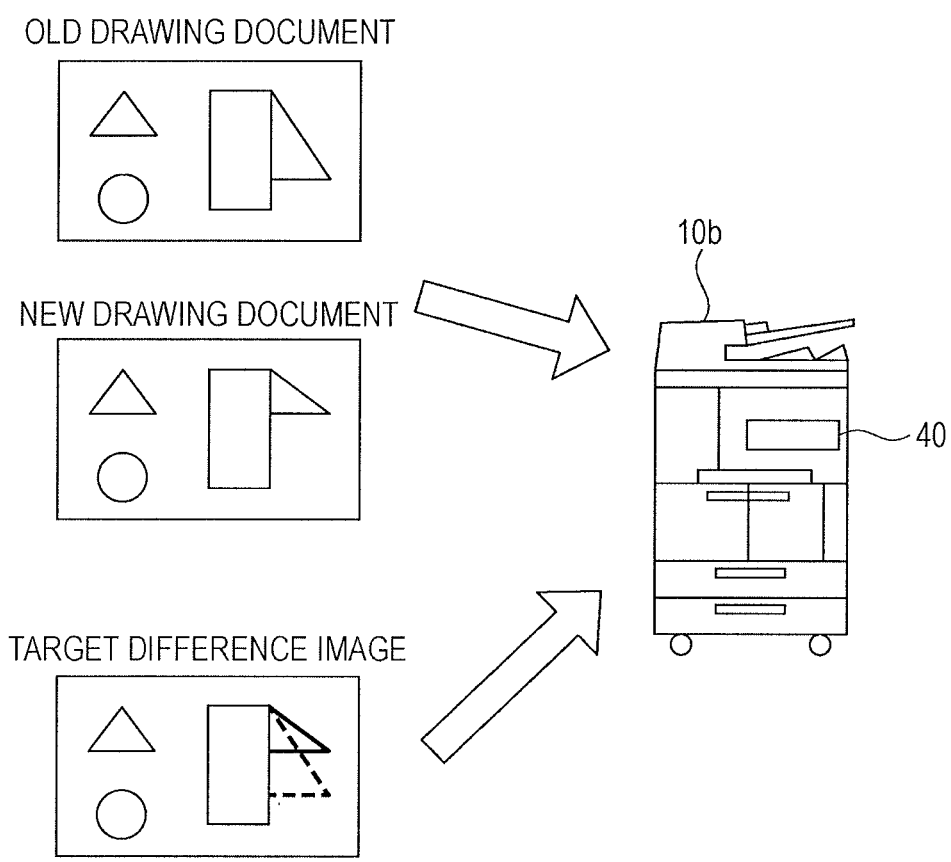
FIG. 8 illustrates an operation in which the second image forming apparatus receives, as a target difference image, a difference image acquired by the first image forming apparatus, together with the old and new drawing documents that have undergone difference detection.

Referring to FIG. 8, the user inputs to the image forming apparatus 10b the old and new drawing documents having undergone the difference detection and a difference image obtained as a target difference image from the image forming apparatus 10a prior to the model replacement.

One image forming apparatus 10 is replaced with another image forming apparatus 10 in this way herein. The same method is applicable not only to the model replacement but also to the case in which multiple image forming apparatuses 10 are mounted on the difference image generation apparatus 40. The parameter setting operation is performed on the difference image generation apparatus 40 so that difference images as close as possible to the same image are obtained on the multiple image forming apparatuses 10.

The operation of the difference image generation apparatus 40 of the first exemplary embodiment is described in detail with reference to the drawings.

Figure 9:
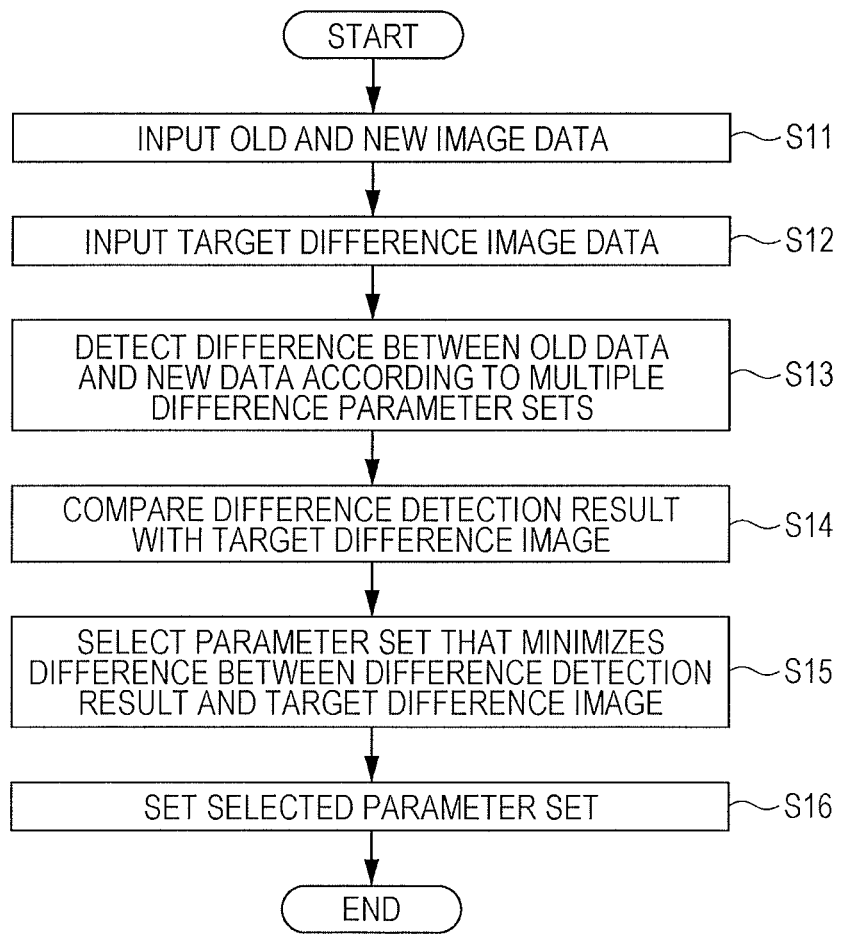
FIG. 9 is a flowchart illustrating a detailed operation that the difference image generation apparatus of the first exemplary embodiment of the present invention performs to input a parameter.

FIG. 9 is a flowchart illustrating a general operation of the difference image generation apparatus 40 of the first exemplary embodiment that sets the parameter.

Referring to FIG. 8, the image data reception part 41 receives two pieces of data, namely, the old and new image data while also receiving, as target difference image data, difference image data desirably obtained when difference detection is performed on the old and new image data (steps S11 and S12).

The parameter setting part 43 successively sets, on the difference detector 42, multiple different parameter sets stored on the parameter memory 46. The difference detector 42 detects a difference between the old image data and the new image data according to each of the multiple different parameter sets (step S13).

The parameter setting part 43 compares a difference detection result and a target difference image (step S14). The parameter setting part 43 selects a parameter set that minimizes a difference between the difference detection result and the target difference image (step S15). The parameter setting part 43 sets the selected parameter set as a parameter that the difference detector 42 is to use in the subsequent difference detection (step S16).

The detailed operation of the difference image generation apparatus 40 of the first exemplary embodiment to set the parameter is described with reference to a flowchart of FIG. 10.

The image data reception part 41 receives the old and new image data, and also receives as the target difference image data the difference image data that is desirable as a difference result in the difference detection of the two pieces of image data (step S101).

Referring to FIG. 11, the parameter setting part 43 extracts image data in a difference region from the input target difference image data, and calculates the number of pixels in the difference image as an amount of difference D(b) (step S102).

A value of 1 is set to N (step S103). The difference detector 42 detects a difference between the old and new images according to the parameter set N, and obtains as the amount of difference D the number of pixels in the difference region in the difference results (step S104).

Calculated in step S105 is the absolute value D(N) of a difference between an amount of difference D(b) obtained in the number of pixels in the difference region in the target difference image and an amount of difference D obtained in the number of pixels in the difference region as a result of difference based on the parameter set N.

Figure 12:
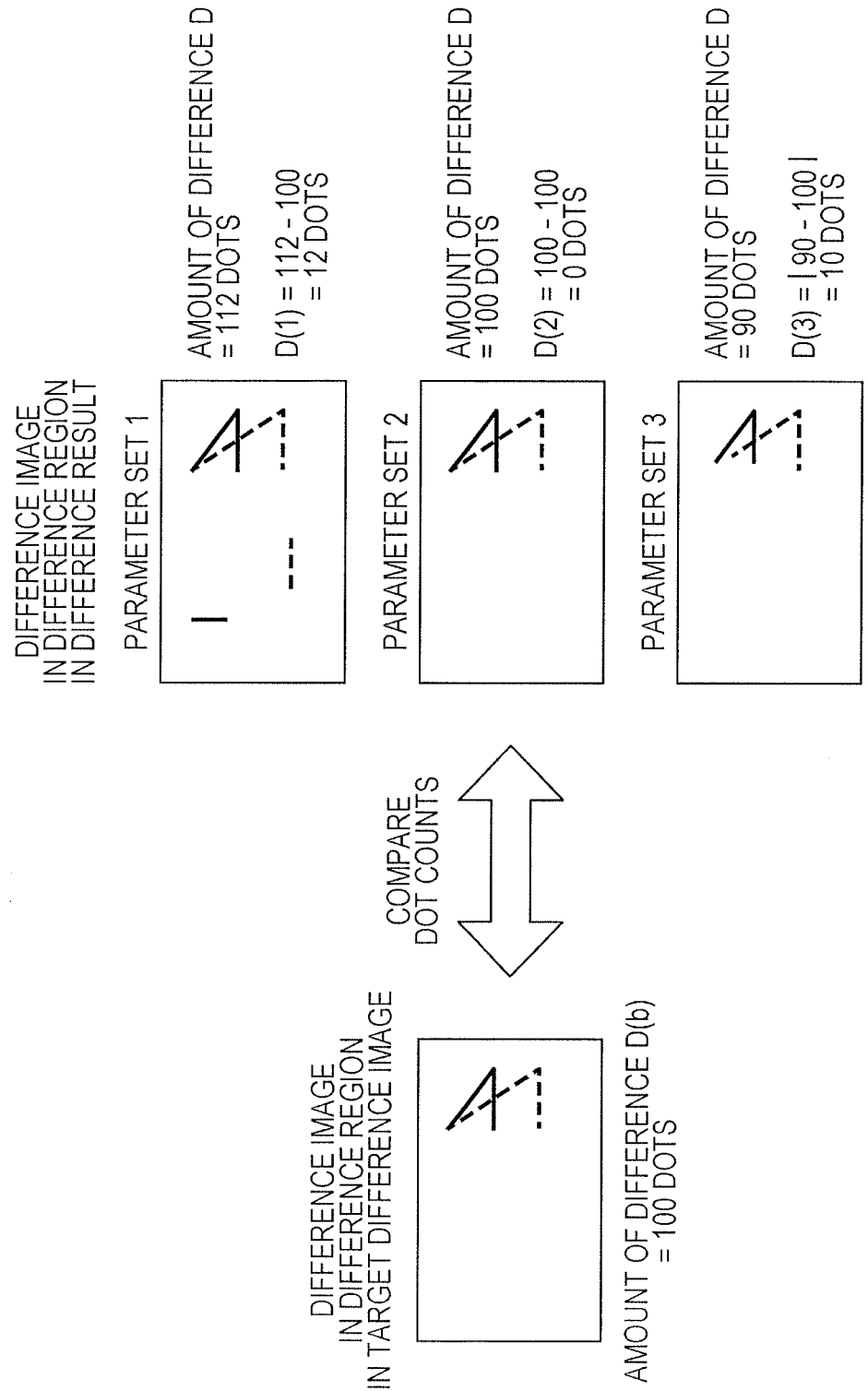
FIG. 12 illustrates how the number of pixels (dot count) in a difference image in a difference region in a target difference image is compared with the number of pixels in a difference image in a difference region of a difference detection result.

Referring to FIG. 12, the amount of difference D in the number of pixels in the difference region based on the difference results in accordance with the parameter set 1 may be 112 dots, and the amount of difference D(b) in the number of pixels in the difference region in the target difference image may be 100 dots. In such a case, D(1)=12 dots. For simplicity of explanation as illustrated in FIG. 12, three parameter sets 1 through 3 are present.

If N is 1 (yes branch from step S106), the initial value of D(1) is set as D(min), and N(min) is set to be 1(=N) (step S107).

If N is not 1 in step S106, it is determined whether D(N) is smaller than D(min) (step S108). If D(N) is smaller than D(min) (yes branch from step S108), the value of D(N) is set to be D(min), and D(min) is set to be N (step S107).

If D(N) is not smaller than D(min) (no branch from step S108), it is determined whether the parameter (N+1) is present (step S109).

If the parameter (N+1) is not present (no branch from step S109), the parameter setting part 43 selects the parameter set N (min), and sets N(min) to be a parameter for use in subsequent difference detection (step S110).

If it is determined in step S109 that the parameter (N+1) is present (yes branch from step S109), the value of N is incremented by 1 (step S111). Processing then returns to step S104.

Through the above process, the number of pixels in the difference image in the difference region in the target difference image is compared with the number of pixels in the difference image in the difference region in the difference image obtained in the difference detection results of each parameter set. A parameter set minimizing the absolute value of the difference is thus selected.

Since the value of D(2) in the difference detection according to the parameter set 2 is the smallest as 0 dots in the example of FIG. 12, the parameter set 2 is selected.

Second Exemplary Embodiment

The operation of the difference image generation apparatus 40 in a second exemplary embodiment of the present invention is described below.

In the first exemplary embodiment described above, the difference image in the difference region in the target difference image is compared in terms of the number of pixels with the difference image in the difference region in the difference image obtained from the difference detection results according to each parameter set.

The second exemplary embodiment is different from the first exemplary embodiment in that difference detection is performed between the difference image in the difference region in the target difference image and the difference image in the difference region in the difference image obtained from the difference detection results based on each parameter set, and that a comparison operation is performed based on the difference results.

Except for the comparison method, the system configuration of the second exemplary embodiment is similar to that of the first exemplary embodiment, and the discussion thereof is omitted herein. The elements in the configuration of the second exemplary embodiment are described with reference to the same reference numerals as those of the first exemplary embodiment.

The difference detector 42 of the second exemplary embodiment detects a difference between two images received from the image data reception part 41 according to each of the multiple parameter sets, and further detects a difference between an image in the difference region in the target difference image and an image in the difference region in the difference image obtained by detecting the difference between the two image received by the image data reception part 41.

The parameter setting part 43 of the second exemplary embodiment selects from the multiple parameter sets a detection condition that minimizes the number of pixels in the difference image of the images at the two difference regions detected by the difference detector 42, and sets the detection condition in the difference detector 42.

Figure 13:
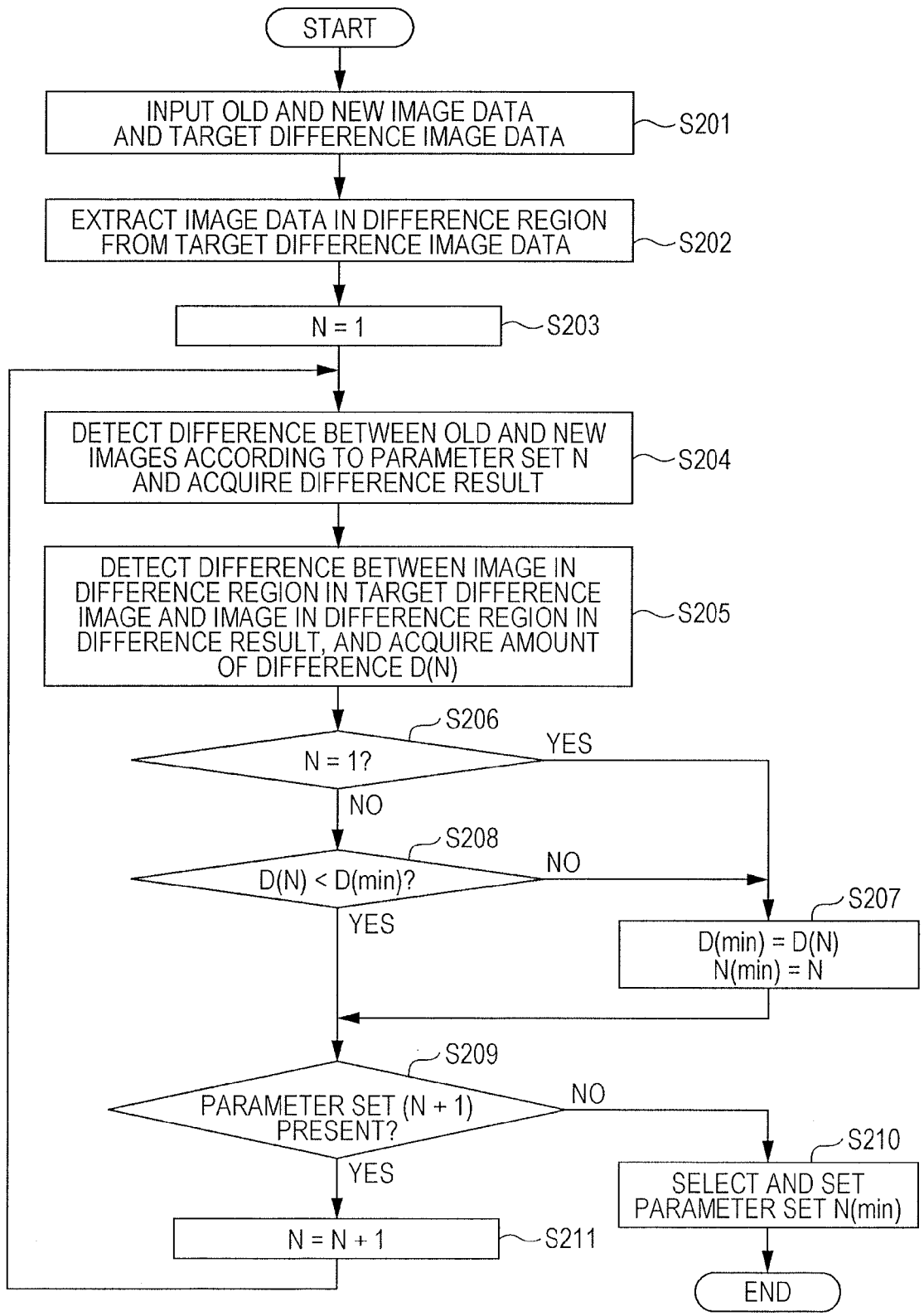
FIG. 13 is a flowchart illustrating a detailed operation that the difference image generation apparatus of a second exemplary embodiment of the present invention performs to set a parameter.

The setting operation of the parameter performed by the difference image generation apparatus 40 to set the parameter is described with reference to a flowchart of FIG. 13.

The image data reception part 41 receives the two pieces of image data, namely, the old and new image data, and receives as the target difference image data the difference image data resulting from the difference detection performed on the old and new image data (step S201).

The parameter setting part 43 extracts the image data in the difference region from the input target difference image data (step S202).

A value 1 is set to N (step S203). The difference detector 42 detects a difference between the old and new images in accordance with the parameter set N, and acquires the difference detection results (step S204).

Figure 14:
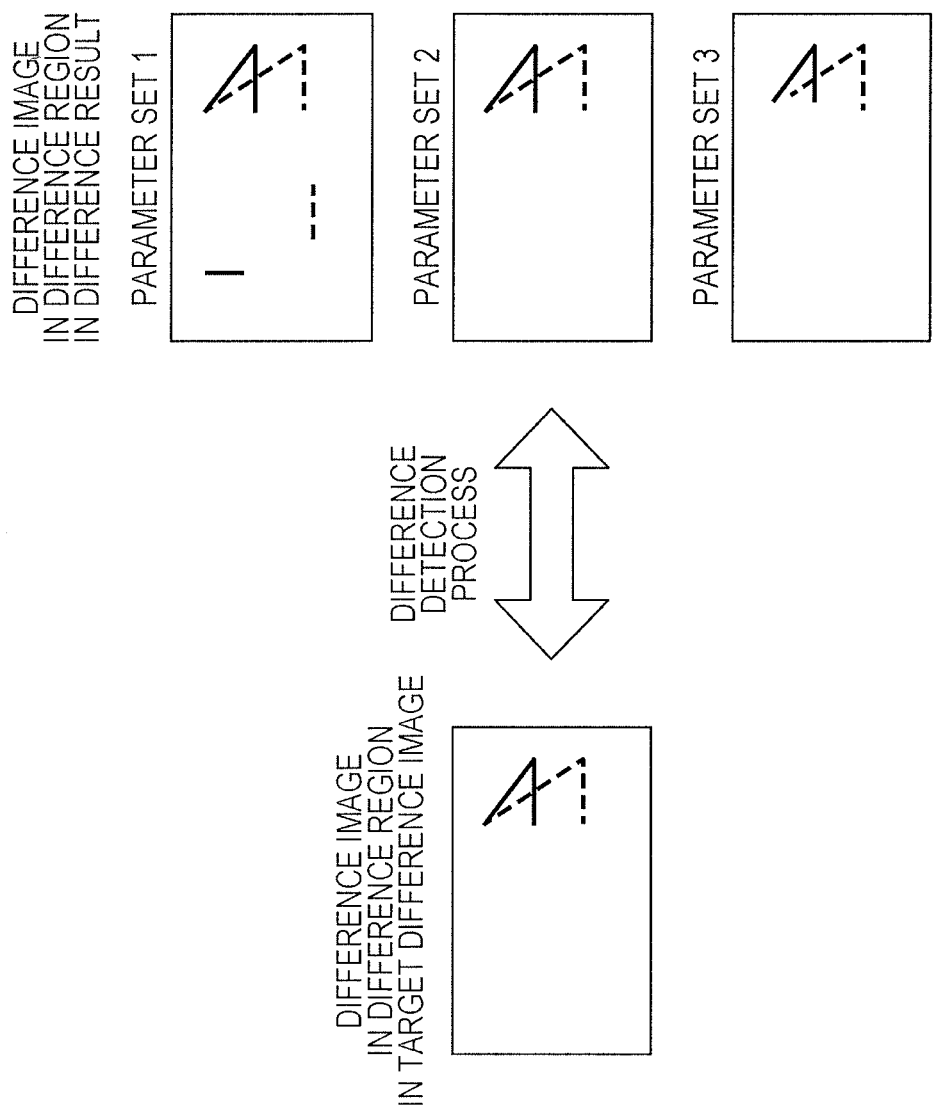
FIG. 14 illustrates how a difference detection operation is performed between a difference image in the difference region in the target difference image and a difference image in the difference region of the difference detection result.

The difference detector 42 performs again the difference detection operation between the difference image in the difference region in the target difference image and the difference image in the difference region as the difference detection results as illustrated in FIG. 14, and acquires as the amount of difference D(N) the number of pixels in the obtained difference image as illustrated in FIG. 15 (step S205).

Figure 10:
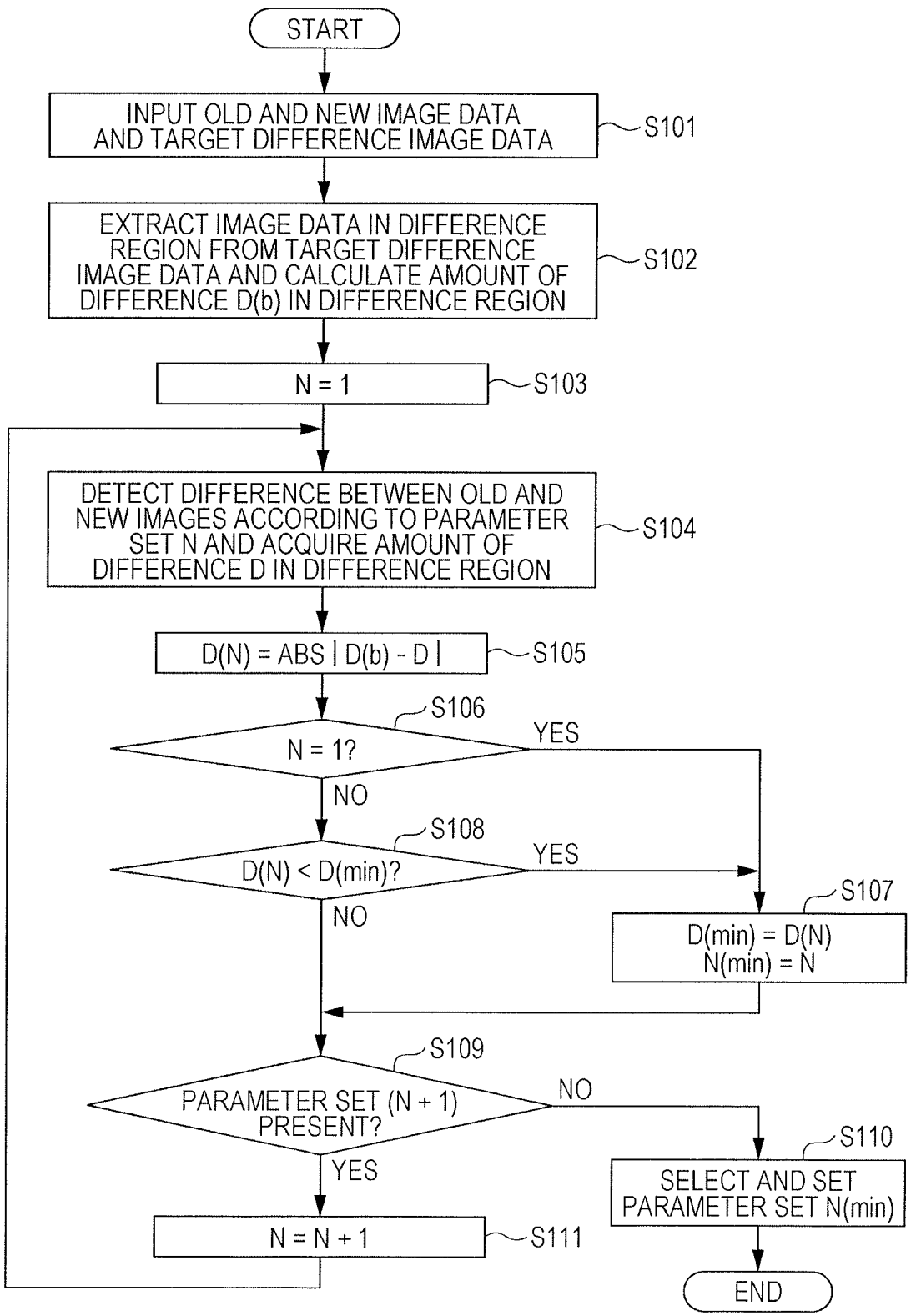
FIG. 10 is a flowchart illustrating a detailed operation that the difference image generation apparatus of the first exemplary embodiment of the present invention performs to input the parameter.

Operations in steps S206 through S211 are similar to operations in steps S106 through S111 in the flowchart of FIG. 10, and the discussion thereof is omitted herein.

In the process of the second exemplary embodiment, the difference is detected between the difference image in the difference region in the target difference image and the difference image in the difference region in the difference image resulting from the difference detection according to each parameter set. The parameter set minimizing the number of pixels in the difference detection results is thus selected.

Since the amount of difference D(2) detected according to the parameter set 2 is zero, and thus a minimum in the example of FIG. 15, the parameter set 2 is selected.

Third Exemplary Embodiment

The operation of the difference image generation apparatus 40 of a third exemplary embodiment of the present invention is described below.

In the second exemplary embodiment, the difference image in the difference region in the target difference image is compared with the difference image in the difference region in the difference image resulting from the difference detection according to each parameter set, by performing the difference detection.

In contrast, the third exemplary embodiment is different from the second exemplary embodiment in that the comparison between the difference image in the difference region in the target difference image and the difference image in the difference region in the difference image resulting from the difference detection is performed according to the number of pixels, and that if the difference is a preset value, the difference detection is further performed.

Except for the comparison method, the system configuration of the third exemplary embodiment is similar to that of the first exemplary embodiment, and the discussion thereof is omitted herein. The elements in the configuration of the third exemplary embodiment are described with reference to the same reference numerals as those of the first exemplary embodiment.

The difference detector 42 of the third exemplary embodiment detects a difference between the two images received from the image data reception part 41 according to each of the multiple parameter sets. The difference detector 42 then selects a parameter set that causes to be lower than a threshold value C (such as 10 dots) a difference between the number of pixels in the difference region in the target difference image and the number of pixels in the difference region in the difference image detected by the image data reception part 41. The difference detector 42 further detects a difference between the image in the difference region in the target difference image and the image in the difference region in the difference image corresponding to the selected detection condition.

The parameter setting part 43 of the third exemplary embodiment selects from the multiple parameter sets a detection condition that minimizes the number of pixels in the difference images of the images at the two difference regions detected by the difference detector 42, and then sets the detection condition in the difference detector 42.

Figure 16:
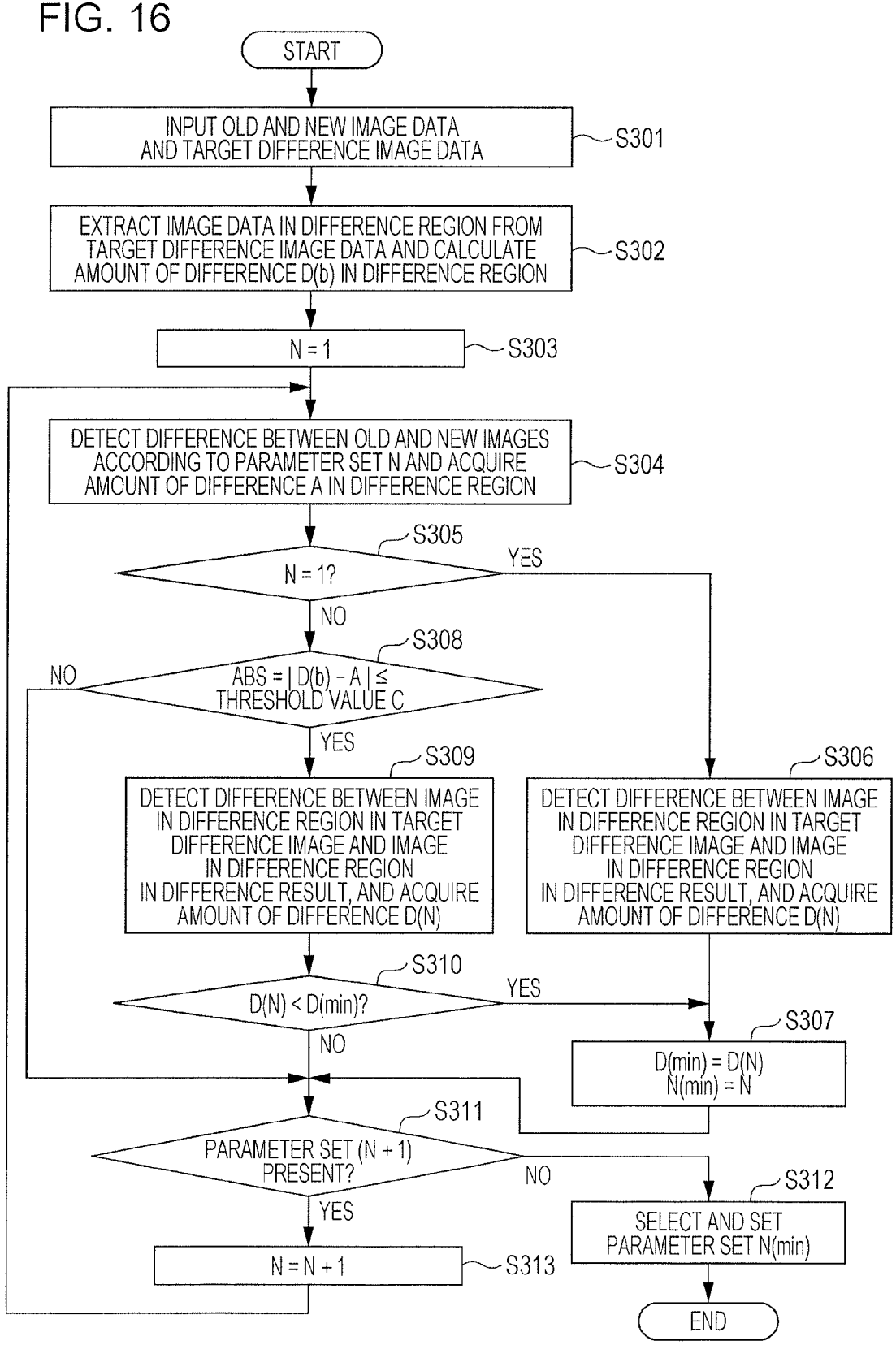
FIG. 16 is a flowchart illustrating a detailed operation that the difference image generation apparatus of a third exemplary embodiment of the present invention performs to set a parameter.

The parameter setting operation of the difference image generation apparatus 40 of the third exemplary embodiment is described in detail with reference to a flowchart of FIG. 16.

The image data reception part 41 receives the two pieces of image data, namely, the old and new image data, and receives, as the target difference image data, desirable difference image data resulting from the difference detection performed on the old and new image data (step S301).

The parameter setting part 43 extracts image data in a difference region from the input target difference image data, and calculates the number of pixels in the difference image in the difference region as an amount of difference D(b) (step S302).

A value 1 is set to N (step S303). The difference detector 42 detects a difference between the old and new images in accordance with the parameter set N, and acquires the difference detection results (step S304). The number of pixels in the difference region is an amount of difference A.

If N is 1 (yes branch from step S305), the difference detector 42 detects a difference between the image in the difference region in the target difference image and the image in the difference region in the difference results, and acquires the resulting number of pixels as an amount of difference D(N) (step S306).

An initial value D(1) is set to D(min), and 1 is set to N(min) (step S307).

If N is not 1 in step S305, it is determined whether the absolute value of a difference between the amount of D(b) and the amount of difference A is equal to or below a threshold value C (step S308).

If it is determined that the absolute value of a difference between the amount of D(b) and the amount of difference A is above the threshold value C (no branch from step S308), processing proceeds to step S311 to determine whether the parameter set (N+1) is present with operations in steps S309 and S310 skipped.

If it is determined that the absolute value of a difference between the amount of D(b) and the amount of difference A is equal to or below the threshold value C (yes branch from step S308), the difference detector 42 performs the same operation as that in step S306. More specifically, the difference detector 42 detects a difference between the image in the difference region in the target difference image and the image in the difference region in the difference results, and acquires the resulting number of pixels as the amount of difference D(N) (step S309).

It is determined whether D(N) is smaller than D(min) (step S310). If it is determined that D(N) is smaller than D(min) (yes branch from step S310), the value of D(N) is set to be D(min), and N is set to N(min) (step S307).

If it is determined that D(N) is not smaller than D(min) (no branch from step S310), it is then determined whether the parameter set (N+1) is present (S311).

If it is determined that the parameter set (N+1) is present (no branch from S311), the parameter setting part 43 selects the parameter set N(min), and sets the parameter set N(min) as a parameter to be used in the subsequent difference detection (step S312).

If it is determined that the parameter set (N+1) is not present (yes branch from S311), the value of N is incremented by 1 (step S313). Processing returns to step S304.

In the third exemplary embodiment, through the above-described process, the difference detection is performed between the difference image in the difference region in the target difference image and the difference image in the difference region in the difference image resulting from the difference detection based on each parameter set. If the number of pixels as the difference detection results is equal to or below the threshold value C, the difference detection is performed on the difference images. A parameter set minimizing the number of pixels in the difference image resulting from the difference detection is then selected.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising at least one hardware processor configured to implement:
   a difference detector that detects a difference between two images according to a set detection condition;
   a receiving part that receives the two images as comparison targets and a target difference image that is desirable in difference detection of the two images; and
   a setting part that selects a detection condition from a plurality of predetermined detection conditions and sets the selected detection condition in the difference detector, the selected detection condition causing a difference image that is acquired by the difference detector from the two images received by the receiving part to be closer to the target difference image,
   wherein the setting part selects, from the predetermined detection conditions, a detection condition that reduces a difference between a number of pixels in a difference region in the target difference image and a number of pixels in a difference region in the difference image detected by the difference detector and sets the selected detection condition in the difference detector.

2. The image processing apparatus according to claim 1, wherein the difference detector detects the difference between the two images received by the receiving part according to each of the predetermined detection conditions, and wherein the setting part selects from the predetermined detection conditions a detection condition that minimizes the difference between the number of pixels in the difference region in the target difference image and the number of pixels in the difference region in the difference image detected by the difference detector and sets the selected detection condition in the difference detector.

3. The image processing apparatus according to claim 2, wherein the predetermined detection conditions are at least one selected alone or in combination from a resolution of the images as the comparison targets, a noise removal level in reading the images, a difference detection sensitivity that specifies a degree of discrepancy that is regarded as a difference, and a position correction level of the two images as the comparison targets.

4. The image processing apparatus according to claim 1, wherein the difference detector detects the difference between the two images received by the receiving part according to each of the predetermined detection conditions, and detects a difference between an image in a difference region in the target difference image and an image in a difference region in a difference image resulting from detecting the difference between the two image received by the receiving part, and
wherein the setting part selects from the predetermined detection conditions a detection condition that reduces a number of pixels in a difference image between images at the two difference regions detected by the difference detector, and sets the selected detection condition in the difference detector.

5. The image processing apparatus according to claim 4, wherein the predetermined detection conditions are at least one selected alone or in combination from a resolution of the images as the comparison targets, a noise removal level in reading the images, a difference detection sensitivity that specifies a degree of discrepancy that is regarded as a difference, and a position correction level of the two images as the comparison targets.

6. The image processing apparatus according to claim 1, wherein the difference detector detects the difference between the two images received by the receiving part according to each of the predetermined detection conditions, selects a detection condition that causes to be smaller than a preset value a difference between a number of pixels in a difference region in the target difference image and a number of pixels in a difference region in the difference image detected by the difference detector, and detects a difference between an image in the difference region in the target difference image and an image in the difference region in the difference image corresponding to the selected detection condition, and
wherein the setting part selects from the predetermined detection conditions a detection condition that reduces a number of pixels in a difference image between images at the two difference regions detected by the difference detector, and sets the selected detection condition in the difference detector.

7. The image processing apparatus according to claim 6, wherein the predetermined detection conditions are at least one selected alone or in combination from a resolution of the images as the comparison targets, a noise removal level in reading the images, a difference detection sensitivity that specifies a degree of discrepancy that is regarded as a difference, and a position correction level of the two images as the comparison targets.

8. The image processing apparatus according to claim 1, wherein the predetermined detection conditions are at least one selected alone or in combination from a resolution of the images as the comparison targets, a noise removal level in reading the images, a difference detection sensitivity that specifies a degree of discrepancy that is regarded as a difference, and a position correction level of the two images as the comparison targets.

9. An image forming apparatus comprising at least one hardware processor configured to implement:
a difference detector that detects a difference between two images according to a set detection condition;
a receiving part that receives the two images as comparison targets and a target difference image that is desirable in difference detection of the two images;
a setting part that selects a detection condition from a plurality of predetermined detection conditions and sets the selected detection condition in the difference detector, the selected detection condition causing a difference image that is acquired by the difference detector from the two images received by the receiving part to be closer to the target difference image received by the receiving part;
a generator that generates difference image data that is organized so that a difference region detected by the difference detector is visibly recognized; and
an output part that outputs an image based on the difference image data generated by the generator,
wherein the setting part selects, from the predetermined detection conditions, a detection condition that reduces a difference between a number of pixels in a difference region in the target difference image and a number of pixels in a difference region in the difference image detected by the difference detector and sets the selected detection condition in the difference detector.

10. An image processing method comprising:
detecting, by a difference detector, a difference between two images according to a set detection condition;
receiving the two images as comparison targets and a target difference image that is desirable in difference detection of the two images; and
selecting a detection condition from a plurality of predetermined detection conditions and setting the selected detection condition in the difference detector, the selected detection condition causing a difference image that is acquired from the two received images to be closer to the received target difference image,
wherein the setting selects, from the predetermined detection conditions, a detection condition that reduces a difference between a number of pixels in a difference region in the target difference image and a number of pixels in a difference region in the difference image detected by the detecting and sets the selected detection condition in the difference detector.

11. A non-transitory computer readable medium storing a program causing a computer to execute a process for processing an image, the process comprising:
receiving two images as comparison targets and a target difference image that is desirable in difference detection of the two images;
detecting, by a difference detector, a difference between the two received images according to each of a plurality of predetermined detection conditions; and
selecting and setting from the predetermined detection conditions a detection condition that causes a difference image that is acquired by detecting the difference between the two received images to be closer to the target difference image,
wherein the setting selects, from the predetermined detection conditions, a detection condition that reduces a difference between a number of pixels in a difference region in the target difference image and a number of pixels in a difference region in the difference image detected by the detecting and sets the selected detection condition in the difference detector.

* * * * *